(12) United States Patent
Arumugam et al.

(10) Patent No.: US 10,440,679 B2
(45) Date of Patent: Oct. 8, 2019

(54) PASSENGER LOAD PREDICTION SYSTEMS AND METHODS FOR PREDICTING PASSENGER LOAD

(71) Applicant: Hitachi, Ltd., Chiyoda-ku, Tokyo (JP)

(72) Inventors: Rajesh Vellore Arumugam, Singapore (SG); Wujuan Lin, Singapore (SG); Yutaka Kudo, Singapore (SG); Su Hnin Wut Yi, Singapore (SG)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/086,966

(22) PCT Filed: Jul. 27, 2016

(86) PCT No.: PCT/SG2016/050355
§ 371 (c)(1),
(2) Date: Sep. 20, 2018

(87) PCT Pub. No.: WO2018/021958
PCT Pub. Date: Feb. 1, 2018

(65) Prior Publication Data
US 2019/0124619 A1 Apr. 25, 2019

(51) Int. Cl.
*H04W 64/00* (2009.01)
*H04W 28/02* (2009.01)
(Continued)

(52) U.S. Cl.
CPC ...... *H04W 64/006* (2013.01); *G06Q 30/0202* (2013.01); *G06Q 30/0205* (2013.01);
(Continued)

(58) Field of Classification Search
CPC ..... H04W 64/006; H04W 4/42; H04W 4/025; H04W 28/0226; G06Q 50/30
See application file for complete search history.

(56) References Cited

U.S. PATENT DOCUMENTS

2012/0290251 A1* 11/2012 Groeneweg ........... B61L 23/042
702/130
2014/0058623 A1* 2/2014 Kraeling ................. H04L 12/40
701/34.4
(Continued)

FOREIGN PATENT DOCUMENTS

WO WO-2015-090326 A1 6/2015
WO WO-2015-090328 A1 6/2015

OTHER PUBLICATIONS

International Search Report issued in corresponding application No. PCT/SG2016/050355 dated Feb. 2, 2017.

*Primary Examiner* — Inder P Mehra
(74) *Attorney, Agent, or Firm* — Foley & Lardner LLP

(57) ABSTRACT

According to various embodiments, there is provided a passenger load prediction system including: a component configured to detect a wireless device carried by a passenger on a train or a train station platform, the train including a plurality of train cars; a passenger to train car mapper configured to determine a location of the passenger, based on a location of the wireless device; a destination predictor configured to predict a destination of the passenger, based at least in part on an identifier code of the wireless device; and a train car load level estimator configured to predict a respective passenger load of each train car of the plurality of train cars, based on the predicted destination and further based on the determined location of the passenger.

14 Claims, 11 Drawing Sheets

(51) Int. Cl.
*H04W 4/02* (2018.01)
*H04W 4/029* (2018.01)
*H04W 4/42* (2018.01)
*G06Q 50/30* (2012.01)
*G06Q 30/02* (2012.01)
*G01C 21/34* (2006.01)
*H04W 4/024* (2018.01)

(52) U.S. Cl.
CPC ............ *G06Q 50/30* (2013.01); *H04W 4/025* (2013.01); *H04W 4/029* (2018.02); *H04W 4/42* (2018.02); *H04W 28/0226* (2013.01); *G01C 21/34* (2013.01); *H04W 4/024* (2018.02)

(56) References Cited

U.S. PATENT DOCUMENTS

| | | | | |
|---|---|---|---|---|
| 2014/0316701 | A1* | 10/2014 | Cardonha | G01C 21/20 701/537 |
| 2015/0066558 | A1* | 3/2015 | Kimiagar | G06Q 10/06313 705/7.17 |
| 2016/0080921 | A1* | 3/2016 | Yadav | H04W 4/023 455/404.2 |
| 2016/0212578 | A1* | 7/2016 | Tong | H04W 76/14 |
| 2016/0221591 | A1* | 8/2016 | Kuehbandner | B61L 1/165 |
| 2016/0379141 | A1* | 12/2016 | Judge | G06Q 20/0453 705/5 |

* cited by examiner

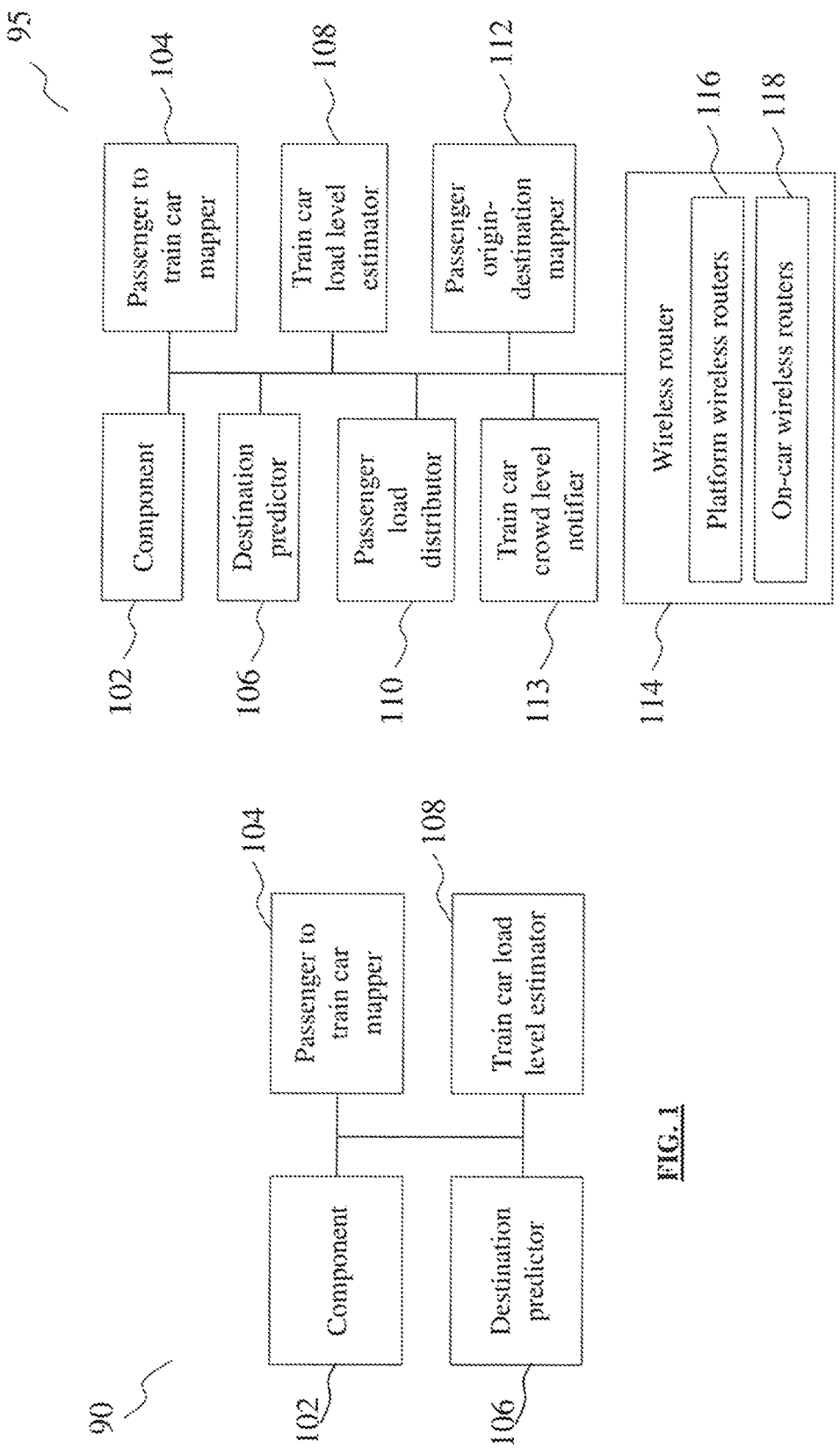

Transport App Train Information Display format 600

| 601 | 602 | 603 | 604 | 605 |
|---|---|---|---|---|
| Next Train time | Car 1 crowd | Car 2 crowd | Car 3 crowd | Recommended Boarding Car |
| 2 minutes | 80% | 90% | 70% | Car 3 |
| 3 minutes | 80% | 78% | 95% | Car 1 |

FIG. 12

PASSENGER LOAD PREDICTION SYSTEMS AND METHODS FOR PREDICTING PASSENGER LOAD

TECHNICAL FIELD

The present invention relates to passenger load prediction systems and methods for predicting passenger load.

BACKGROUND

With rapid urbanization and population growth, major cities around the world, including Singapore, are facing the problem of traffic congestion. Therefore, in order to achieve sustainable growth, many cities are looking out for innovative solutions to improve the service quality of public transportation so as to make public transportation the preferred commuting choice for their residents. One of the extensively used public transport services in large metro cities is the railway system. However, there may be significant challenges in providing comfortable and good service quality in railway networks as travel demand increases. One approach for improving travel experience in public transport may be to keep the commuters waiting at the railway platforms or bus stops informed about crowd levels in the approaching train or bus. For railway services, the information on crowd levels may be provided for each carriage or train car in the train. This may allow the commuter to make an informed decision on whether to board the next approaching train or to choose the train carriage or car that is the least crowded. This type of service may therefore significantly improve the travel experience of the commuters. Sensors may be used to measure the crowd levels in the train cars. One approach may be to use onboard cameras in the train cars to measure the crowd level through image analysis. The measured crowd level for each train car may be communicated to over-head displays at the approaching station platform. The commuter will then have a choice to board the least crowded train car. The problem with such a method is that it only considers the current state or load of the train cars. The method cannot determine the future state when the train arrives at the next station and commuters alight from the train cars. This may be an important problem to be addressed as the passenger destinations may not be uniformly distributed amongst the various train cars. For example, a train car may have a large number of passengers alighting at the next station and therefore its load level will be low at the next station. Existing methods for measuring the current load of the train car, will likely inform the commuters waiting at the platform that the train car is full and unable to take in more passengers. As such, the commuters waiting to board the train will be misinformed, as in fact, the train car will have the capacity to take in more passengers at the next train station. Therefore, there is a need for a new method of predicting the passenger load in the train cars.

SUMMARY

According to various embodiments, there may be provided a passenger load prediction system, including a component configured to detect a wireless device carried by a passenger on a train or a train station platform, the train including a plurality of train cars; a passenger to train car mapper configured to determine a location of the passenger, based on a location of the wireless device; a destination predictor configured to predict a destination of the passenger, based at least in part on an identifier code of the wireless device; and a train car load level estimator configured to predict a respective passenger load of each train car of the plurality of train cars, based on the predicted destination and further based on the determined location of the passenger.

According to various embodiments, there may be provided a method for predicting passenger load, the method including detecting a wireless device carried by a passenger on a train, the train including a plurality of train cars; determining a location of the passenger, based on the detection of the wireless device; predicting a destination of the passenger, based at least in part on an identifier code of the wireless device; predicting a respective passenger load in each train car of the plurality of train cars, based on the predicted destination and further based on the determined location of the passenger.

According to various embodiments, there may be provided a passenger load prediction system, including a component configured to detect a wireless device carried by a passenger on a train or a train station platform, the train including a plurality of train cars; a passenger to train car mapper configured to determine a location of the passenger, based on a location of the wireless device, wherein the wireless device includes a route search application configured to receive user inputs indicating a desired destination; a destination predictor configured to predict a destination of the passenger, based at least in part on the desired destination; and a train car load level estimator configured to predict a respective passenger load in each train car of the plurality of train cars, based on the predicted destination and further based on the determined location of the passenger.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 1 shows a conceptual diagram of a passenger load prediction system according to various embodiments.

FIG. 2 shows a conceptual diagram of a passenger load prediction system according to various embodiments.

FIG. 12 shows an example of a display format in the transport mobile app according to various embodiments.

DESCRIPTION

Figure 3:
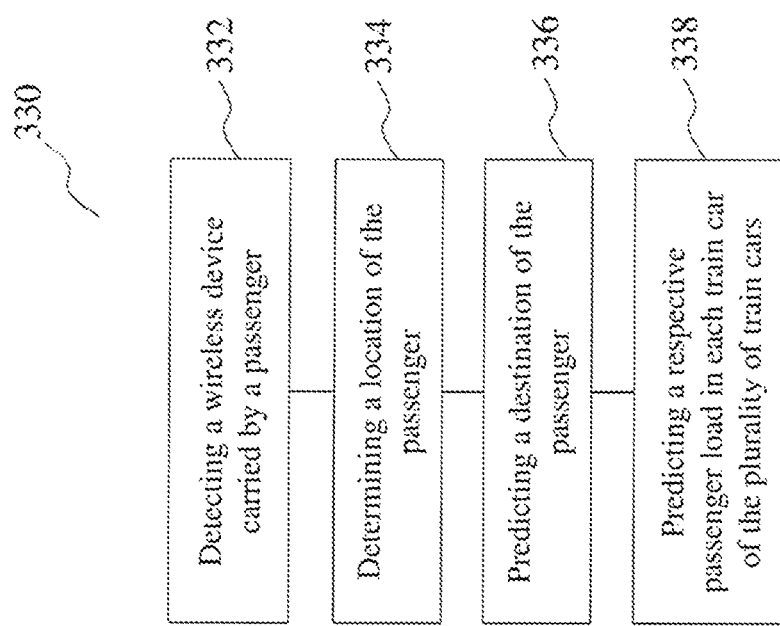
FIG. 3 shows a flow diagram showing a method for predicting passenger load according to various embodiments.

Embodiments described below in context of the passenger load prediction systems are analogously valid for the respective methods, and vice versa. Furthermore, it will be understood that the embodiments described below may be combined, for example, a part of one embodiment may be combined with a part of another embodiment.

It will be understood that any property described herein for a passenger load prediction system may also hold for any passenger load prediction system described herein. It will be understood that any property described herein for a specific method may also hold for any method described herein. Furthermore, it will be understood that for any passenger load prediction system or method described herein, not necessarily all the components or steps described must be enclosed in the device or method, but only some (but not all) components or steps may be enclosed.

In this context, the passenger load prediction system as described in this description may include a memory which is for example used in the processing carried out in the passenger load prediction system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In order that the invention may be readily understood and put into practical effect, particular embodiments will now be described by way of examples and not limitations, and with reference to the figures.

With rapid urbanization and population growth, major cities around the world, including Singapore, are facing the problem of traffic congestion. Therefore, in order to achieve sustainable growth, many cities are looking out for innovative solutions to improve the service quality of public transportation so as to make public transportation the preferred commuting choice for their residents. One of the extensively used public transport services in large metro cities is the railway system. However, there may be significant challenges in providing comfortable and good service quality in railway networks as travel demand increases. One approach for improving travel experience in public transport may be to keep the commuters waiting at the railway platforms or bus stops informed about crowd levels in the approaching train or bus. For railway services, the information on crowd levels may be provided for each carriage or train car in the train. This may allow the commuter to make an informed decision on whether to board the next approaching train or to choose the train carriage or car that is the least crowded. This type of service may therefore significantly improve the travel experience of the commuters. Sensors may be used to measure the crowd levels in the train cars. One approach may be to use onboard cameras in the train cars to measure the crowd level through image analysis. The measured crowd level for each train car may be communicated to over-head displays at the approaching station platform. The commuter will then have a choice to board the least crowded train car. The problem with such a method is that it only considers the current state or load of the train cars. The method cannot determine the future state when the train arrives at the next station and commuters alight from the train cars. This may be an important problem to be addressed as the passenger destinations may not be uniformly distributed amongst the various train cars. For example, a train car may have a large number of passengers alighting at the next station and therefore its load level will be low at the next station. Existing methods for measuring the current load of the train car, will likely inform the commuters waiting at the platform that the train car is full and unable to take in more passengers. As such, the commuters waiting to board the train will be misinformed, as in fact, the train car will have the capacity to take in more passengers at the next train station.

When the train approaches a station, there may be more passengers alighting one of the train cars as compared to the remaining train cars. Take for example, in a scenario where train car 1 and train car 2 of an approaching train are equally crowded when the train arrives at the station. Train car 1 may have more passengers alighting as compared to train car 2. In this scenario, some commuters waiting on the platform near to the entrance of train car 2 may not be able to board the train as only a few passengers from train car 2 alighted. Even though there may be enough space in train car 1, the commuters waiting near car 2 doors are unable to board. This is due to the fact that the passenger destination distribution in the train cars may not be uniform. Without having passenger destination distributions at the train car level, the existing sensor-based methods are unable to estimate the load of the train cars when the train arrives at the station. Even if the existing sensor-based methods were to estimate the train car load level after the passengers have alighted at the station, the information would not be useful for the commuters waiting at the platform as the information would be provided too late for the commuters to move to the less crowded train cars, not to mention irrelevant given that by then the commuters may be able to assess for themselves the load level of the train cars.

In the context of various embodiments, the phrase "train car" may be but is not limited to being interchangeably referred to as "carriage".

In the context of various embodiments, the phrase "passenger load prediction system" may be but is not limited to being interchangeably referred to as "train car load estimation system".

In the context of various embodiments, the phrase "passenger load" may be but is not limited to being interchangeably referred to as "train car load" or "crowd level".

In the context of various embodiments, "passengers" may be but is not limited to being interchangeably referred to as "commuters".

In the context of various embodiments, "train station" may be but is not limited to being interchangeably referred to as "railway station".

FIG. 1 shows a conceptual diagram of a passenger load prediction system 90 according to various embodiments. The passenger load prediction system 90 may include a component 102 configured to detect a wireless device carried by a passenger on a train including a plurality of train cars, or a train station platform. The passenger load prediction system 90 may further include a passenger to train car mapper 104 configured to determine a location of the passenger, based on a location of the wireless device. The passenger load prediction system 90 may further include a destination predictor 106 configured to predict a destination of the passenger, based at least in part on an identifier code of the wireless device. The passenger load prediction system 90 may further include a train car load level estimator 108 configured to predict a respective passenger load of each train car of the plurality of train cars, based on the predicted destination and further based on the determined location of the passenger.

In other words, according to various embodiments, a passenger load prediction system 90 may include a component 102, a passenger to train car mapper 104, a destination predictor 106 and a train car load level estimator 108. The component 102 may be for example, a circuit. The passenger load prediction system 90 may be used to predict the passenger load in each train car of a train that includes a plurality of train cars. A passenger may carry a wireless device, such as a mobile telephone, a mobile computer, a tablet computer, a gaming console, a digital camera, a digital audio player, a smart watch or a wearable technology device. The wireless device may be detectable by the component 102. In other words, the component 102 may be configured to detect the wireless device and may thereby determine a location of the wireless device. The component 102 may pass the information of the location of the wireless device to the passenger to train car mapper 104. The passenger to train car mapper 104 may determine a location of the passenger based on the location of the wireless device. For example, the passenger to train car mapper 104 may determine that the passenger is onboard the third train car of the train. The destination predictor 106 may be configured to predict the passenger's destination. The prediction may be made partly based on an identifier code of the wireless device. The identifier code may be unique to the wireless device, such that another wireless device has a different identifier code. The identifier code may be a media access control (MAC) identification document (ID), also referred herein as MAC address. The identifier code may also be any one of a unique device identifier (UDID), Android ID, international mobile equipment identity (IMEI) or international mobile subscriber identity (IMSI). The train car load level estimator 108 may be configured to predict a respective passenger load of each train car of the plurality of train cars, based on the predicted destination and further based on the determined location of the passenger. The train car load level estimator 108 may be configured to predict the respective passenger load of each train car of the plurality of train cars, further based on a respective weight load of each train car obtained using weight sensors on the train cars.

FIG. 2 shows a conceptual diagram of a passenger load prediction system 95 according to various embodiments. The passenger load prediction system 95 may be similar to the passenger load prediction system 90 in that it may include the component 102, the passenger to train car mapper 104, the destination predictor 106 and the train car load estimator 108. In addition to the passenger load prediction system 90, the passenger load prediction system 95 may further include a passenger load distributor 110, a passenger origin-destination mapper 112, a wireless router 114 and a train car crowd level notifier 113. The passenger load distributor 110 may be configured to compute an optimal distribution of further passengers to each train car based on the predicted respective passenger load of each train car. The passenger load distributor 110 may compute the optimal distribution further based on identification of passengers travelling as a group. The identification of passengers travelling as a group may be obtained from historical records of identifier codes of wireless devices which simultaneously undertook common journeys. For example, if the historical records show that wireless device A and wireless device B had repeatedly been detected at the same train cars at the same time, they may be classified as members of one travel group. The passenger load distributor 110 may allocate the passengers of wireless device A and wireless B to the same train car, instead of directing them to different train cars. The passenger origin-destination mapper 112 may be configured to obtain a journey database of the passenger based on historical records of wireless devices connected to a wireless router positioned at one train station or one train car of the plurality of train cars. The journey database may include a start point and an end point of each journey matched with the identifier code of the wireless device. The passenger origin-destination mapper 112 may be configured to match historical records of wireless devices having common identifier codes detected during predetermined travel intervals on different days of the week, to determine the start point and the end point of each journey of the passenger. The wireless router 114 may be configured to detect a plurality of wireless devices of different passengers. The wireless router 114 may be further configured to retrieve the identifier code of each wireless device of the plurality of wireless devices. The wireless router 114 may include a plurality of platform wireless routers 116. Each platform wireless router 116 of the plurality of platform wireless routers 116 may be positioned at a respective train station, for example, at the platforms of the train stations. The wireless router 114 may include a plurality of on-car wireless routers 118. Each on-car wireless router 114 of the plurality of on-car wireless routers 118 may be positioned at a respective train car of the plurality of train cars. The train car crowd level notifier 113 may be configured to generate notifications based on the predicted respective passenger load of each train car. For example, the train car crowd level notifier may send messages to the wireless device to inform the passenger that a particular train car of the arriving train will have vacancies for 20 passengers at the station where the passenger is waiting to board the train. The notifications may also be displayed on electronic signboards positioned at the train stations, for example, at the platforms.

According to various embodiments, the destination predictor 106 may be configured to predict the destination of the passenger based at least in part on a desired destination entered by the passenger into a route search application in the wireless device. In other words, the wireless device may include the route search application configured to receive user inputs indicating a desired destination. The destination predictor 106 may predict the destination of the passenger based at least partially on the desired destination. For example, the passenger may use the route search application to search for an itinerary to travel to the Changi Airport, in other words, the desired destination entered by the passenger is "Changi Airport". Using this information, the destination predictor 106 may predict that the destination of the passenger is Changi Airport station. The route search application may also provide information on the future travel time of the passenger, for example, the passenger may search in the route search application, for an itinerary to reach the desired destination by a particular time. The passenger may also enter into the route search application, his departure location and departure time. The route search application may also predict the time that the passenger will board the train, based on the departure location and departure time entered by the passenger.

FIG. 3 shows a flow diagram 330 showing a method for predicting passenger load according to various embodiments. The flow diagram 300 includes a plurality of processes 332, 334, 336 and 338. In 332, a wireless device carried by a passenger may be detected. The passenger may be onboard a train car of a train. The train may include a plurality of train cars. The passenger may alternatively be waiting for the train on a train station platform. In 334, a location of the passenger may be determined. The location of the passenger may be determined based on the location of the wireless device. The location of the passenger may be an identification of the train car where the passenger boarded the train or an identification of the train station platform where the passenger is waiting for the train. The location of the passenger may be indicated as one train car of the plurality of train cars, where the passenger boarded the train. In 336, a destination of the passenger may be predicted based at least in part on an identifier code of the wireless device. In 338, a respective passenger load in each train car of the plurality of train cars may be predicted, based on the predicted destination and further based on the determined location of the passenger.

According to various embodiments, a passenger load prediction system may be configured to determine the passenger destination distribution in each train car of a train. In other words, the passenger load prediction system may be capable of estimating the respective number of passengers alighting from each train car when the train arrives at a downstream train station. The passenger load prediction system may predict the number of alighting passengers from each train car, even before the train arrives at the next train station. The passenger load prediction system may use the passenger destination distribution to predict the future train car load, in other words, the passenger load of each train car when the train arrives at the next train station or any downstream train station. Information on the passenger load, also referred herein as the crowd level, may be provided to the waiting passengers even before the train approaches the station. Therefore, passengers waiting for the train at the train station platform may have enough time to move to positions on the platform corresponding to the less crowded train cars.

According to various embodiments, a passenger load prediction system may consider the effect of non-uniform number of passengers alighting from each train car at the train station, by determining the passenger destination distributions for each train car. The passenger destination distribution may be obtained by analyzing Wi-Fi connectivity data collected at the railway station platforms. Train operators may provide Wi-Fi connectivity at the railway station platforms and inside the train carriages, for the convenience of train passengers. The passenger load prediction system may leverage on the Wi-Fi connectivity data collected by Wi-Fi routers installed on the railway station platforms and inside the train carriages. Wireless devices used by the passengers to connect to the Wi-Fi may serve as proxies for the passengers themselves, in the analysis process used by the passenger load prediction system. By tracking the wireless devices, the passenger load prediction system may track the location of each passenger with respect to the train car or with respect to the railway station platform, and also collect information on the travel patterns of the passengers.

According to various embodiments, a passenger load prediction system may find out the passengers' destinations by extracting Origin-Destination (OD) travel patterns from historical Wi-Fi connection records. The OD travel patterns may include information such as the origin train station where the passenger boards the train and the destination train station where the passenger alights from the train. The OD travel patterns may also include information on the time at which the passenger boards the train and the time at which the passenger alights. The OD travel patterns may further include information on the day of the week when the passenger takes the train. Passengers waiting at the train station platform may be localized using Wi-Fi localization with respect to platform doors. The location of the passengers with respect to platform doors may be mapped to train doors and may also be mapped to specific train cars. For example, a passenger may be localized to 100 m to the east of a particular wireless router or group of wireless routers. The location of the passenger may match the position of train door C which will correspond to train car C of the train. Using the OD pattern and the location of the wireless device, the passenger may be assigned to a specific destination and a specific train car with the unique identifier code of the passenger's wireless device. The unique identifier code may be part of the Wi-Fi interface of the wireless device. The identifier code may be the MAC address, also referred herein as MAC-ID. The passenger load prediction system may map all wireless devices connected to the Wi-Fi connectivity service to the train car and then to destinations, based on the identifier codes. The mapping may be performed so as to determine the passenger destination distribution for the train. The passenger destination distribution may then be used to estimate the train car load at the next stations by excluding the number of passengers alighting at the next station from the current load of each train car. The current load of each train car may be obtained by a load determiner, for example weight sensors or image analysis. The load determiner may determine the current load of each train car by weighing the train car, or by analyzing images or videos captured in the train car. The passenger load prediction system may communicate information on the predicted train car load at the next station, to the commuters waiting at the next station. The information on the predicted train car load may be communicated to the commuters through at least one of an application on the wireless devices carried by the passengers, or through electronic displays at the train station platforms. The application on the wireless device may be a mobile phone application that may send notifications or alerts to the commuters. The electronic displays may be large overhead displays, for example light emitting diodes (LED) signboards, or television screens or computer monitors.

According to various embodiments, the passenger load prediction system may use the recent route search data of the passenger from external data sources such as Google map, to determine the passenger's destination. The recent route search data may be used in situations where the passenger's destination cannot be determined through the historical Wi-Fi records or the OD travel pattern. For example, the passenger may be deviating from his usual travel itinerary or may have changed his travel pattern. Alternatively, the passenger load prediction system may prioritize the recent route search data above the OD travel pattern. The passenger load prediction system may also take into consideration the passenger's location based on external sources such as Global Positioning System (GPS). For example, if the GPS on the wireless device indicates that the passenger is at Bedok instead of Tampines which is the origin station of his OD travel pattern, the passenger load prediction system may rank the recent route search data as being more relevant to the prediction of the passenger destination. The passenger load prediction system may combine the Wi-Fi localization data with the route search data so as to maximum the number of passengers whose destinations can be predicted. For example, the OD travel pattern may not be available for some passengers but their recent route search data may be available. The estimate of the train car load may be more accurate with a wider coverage of the passengers. In the cases of passengers for whom both the recent route search data and the OD travel pattern are not available, the passenger load prediction system may apply an average destination distribution. The average destination distribution may be based on the average OD travel pattern obtained by analysis of historical Wi-Fi data.

According to various embodiments, a passenger load prediction system may be used to predict crowd levels in carriages of trains in a railway network or in a public railway transport system, such as the Mass Rapid Transit system. The predicted crowd level information may then be provided to users of the railway network so that the users may make informed decisions on which train carriage to board. This may significantly enhance the travel experience of the railway service users. The predicted car level crowd information may be used for distributing the passengers uniformly across all the train cars of a train. This may be achieved by sending messages to the individual commuters to board specific train cars. The messages may be communicated to the commuter with the help of a transport application on their smart phones. The transport application may be downloaded to the passengers' wireless devices. The transport applications may tap the route search service provided by third party applications. The transport application may send the route search service data to the passenger load prediction system. The transport application may present to the users, information on the train car crowd levels at the various train stations. The transport application may also provide the user with the train schedule, so that the users may better plan their trip accordingly.

Figure 4:
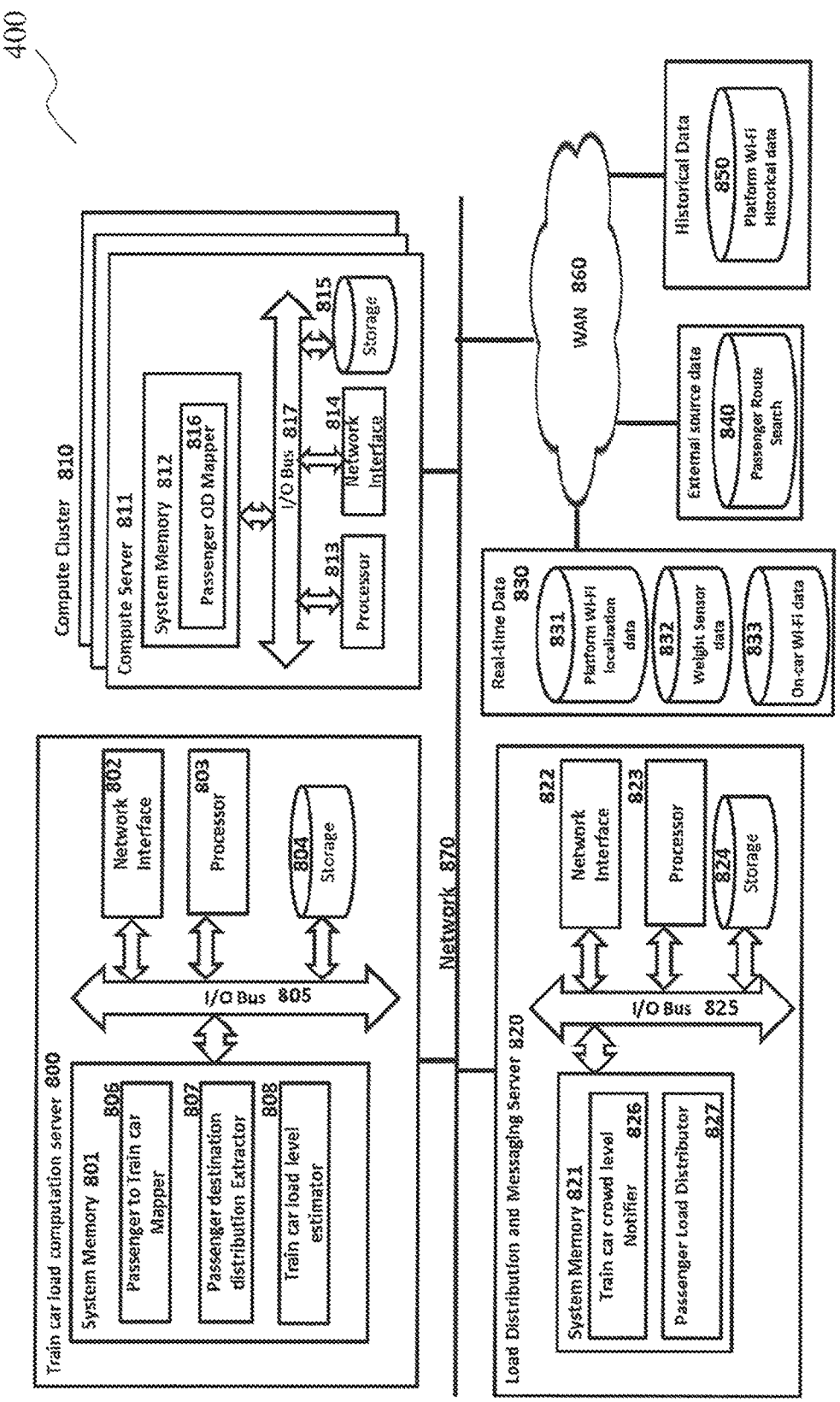
FIG. 4 shows the system architecture of a passenger load prediction system according to various embodiments.

FIG. 4 shows the system architecture of a passenger load prediction system 400 according to various embodiments. The passenger load prediction system 400 may include a train car load computation server 800, a compute cluster 810, a load distribution and messaging server 820 and data sources. The passenger load prediction system 400 may further include a network 870 configured to couple the train car load computation server 800, the compute cluster 810, the load distribution and messaging server 820 and the data sources, or in other words, the network 870 is configured to transmit and receive data between the abovementioned components of the passenger load prediction system 400. The train car load computation server 800 may be the train car load level estimator 108. The train car load computation server 800 may include a system memory 801, a network interface 802, a processor 803 and a storage 804. The train car load computation server 800 may further include an input/output (I/O) bus 805 which is coupled to each of the system memory 801, the network interface 802, the processor 803 and the storage 804. The I/O bus 805 may be configured to transmit or relay electrical signals or power between the system memory 801, the network interface 802, the processor 803 and the storage 804. In other words, the components of the train car load computation server 800 may be interconnected by the I/O bus 805. The system memory 801 may store a plurality of instructions executable by the processor 803. The plurality of instructions may also be referred herein as programs. The programs may include passenger to train car mapper 806, passenger destination distribution extractor 807 and train car load level estimator 808. The passenger to train car mapper 806 may be the passenger to train car mapper 104. The passenger destination distribution extractor 807 may be, or may include the destination predictor 106. These programs may reside in the system memory 801. The storage 804 may be configured to store temporary results and output data of the train car load computation server 800. The train car load computation server 800 may be configured to run one or more instances of the passenger to train car mapper 806, the passenger destination distribution extractor 807 and the train car load level estimator 808.

The compute cluster 810 may include one or more compute servers 811. Each compute server 811 may include a system memory 812, a processor 813, a network interface 814 and a storage 815. Each compute server 811 may further include a I/O bus 817 configured to interconnect the system memory 812, the processor 813, the network interface 814 and the storage 815. Each compute server 811 may be configured to execute a passenger origin-destination (OD) mapper 816 program. The one or more compute servers 811 may execute the passenger OD mapper 816 program simultaneously. In other words, the compute cluster 810 may carry out parallel processing. The passenger OD mapper 816 program may be run on the system memory 812. The input data, temporary results and output data of the passenger OD mapper 816 program may be stored in the storage 815. The compute cluster 810 may be configured to extract the passenger OD pattern. The passenger OD pattern may include information on the origin and destination of each passenger, for example if a passenger A usually boards the train at Station 1 and usually alights the train at Station 2, the origin of passenger A may be Station 1 and the destination of passenger A may be Station 2.

The load distribution and messaging server 820 may include a system memory 821, a network interface 822, a processor 823 and a storage 824. The load distribution and messaging server 820 may further include an I/O bus 825 configured to interconnect the system memory 821, the network interface 822, the processor 823 and the storage 824. The system memory 821 may store a plurality of instructions executable by the processor 823. The plurality of instructions, in other words programs, may include the train car crowd level notifier 826 and the passenger load distributor 827. The train car crowd level notifier 826 may be the train car crowd level notifier 113. The passenger load distributor 827 may be the passenger load distribution 110. These programs may reside in the system memory 821 of the server. The storage 824 may store temporary results and output data of the train car crowd level notifier 826 and the passenger load distributor 827. The load distribution and messaging server 820 may run one or more instances of the train car crowd level notifier 826 and the passenger load distributor 827.

The data sources may be coupled directly to the network 870 or may also be coupled to the network 870 via a Wide Area Network (WAN) 860. The data sources may include real-time data 830, external source data and historical data. The real-time data 830 may be provided to the other components of the passenger load prediction system directly via the network 870. The external source data and the historical data may be provided to the other components of the passenger load prediction system through the WAN 860. The real-time data 830 may include platform Wi-Fi localization data 831, weight sensor data 832 and on-car Wi-Fi data 833. The platform Wi-Fi localization data 831 may be obtained from Wi-Fi radios installed on the platforms of train stations. The platform Wi-Fi localization data 831 may be provided by the platform wireless routers 116. The passenger to train car mapper 806 may be configured to determine the location of the passenger by triangulating the wireless device carried by the passenger, with respect to at least one platform wireless router 116 of the plurality of platform wireless routers 116. The Wi-Fi radios may be one of Wi-Fi receivers, Wi-Fi transceivers or Wi-Fi routers. The Wi-Fi radios may be part of a standard localization system available on the station platform, such that no new equipment needs to be installed. The Wi-Fi radios may be configured to provide wireless internet access. The weight sensor data 832 may be provided by the train service operator. The weight sensor date 832 may be obtained from weight sensors installed in the train cars. Each train car may have a respective weight sensor. The on-car Wi-Fi data 833 may be provided by the train service operator. The on-car Wi-Fi data 833 may be provided by the on-car wireless routers 118. The passenger to train car mapper 806 may be configured to determine the location of the passenger by detecting the wireless device using one on-car wireless router 118 of the plurality of on-car wireless routers 118. The on-car Wi-Fi data 833 may be obtained from Wi-Fi radios installed in the train cars. Each train car may have a respective set of Wi-Fi radios. The Wi-Fi radios may be one of Wi-Fi receivers, Wi-Fi transceivers or Wi-Fi routers. The external source data may include passenger route search 840. The passenger route search 840 may be provided by an external or a third party route search provider, for example a route planning program. Examples of third party route search providers include Google Maps, Streetdirectory.com, Gothere.sg. Commuters may use such passenger route search 840 programs to find out how they may travel to their destinations. For example, a commuter may input his origin location, in other words, the start point of his journey. The commuter may also input his desired destination, in other words, the end point of his journey. The passenger route search 840 program may be configured to generate a route including how to travel from the start point to the end point. The route may include the public transport services to board and which stations to alight or transfer at. The historical data may include platform Wi-Fi historical data 850. The platform Wi-Fi historical data 850 may be collected over a period of several weeks, months or longer. The platform Wi-Fi historical data 850 may include information on the Wi-Fi enabled mobile devices detected at the various platforms of the various train stations. The information may include identifier codes of the mobile devices, the date and time of detection and the location of detection.

Figure 5:
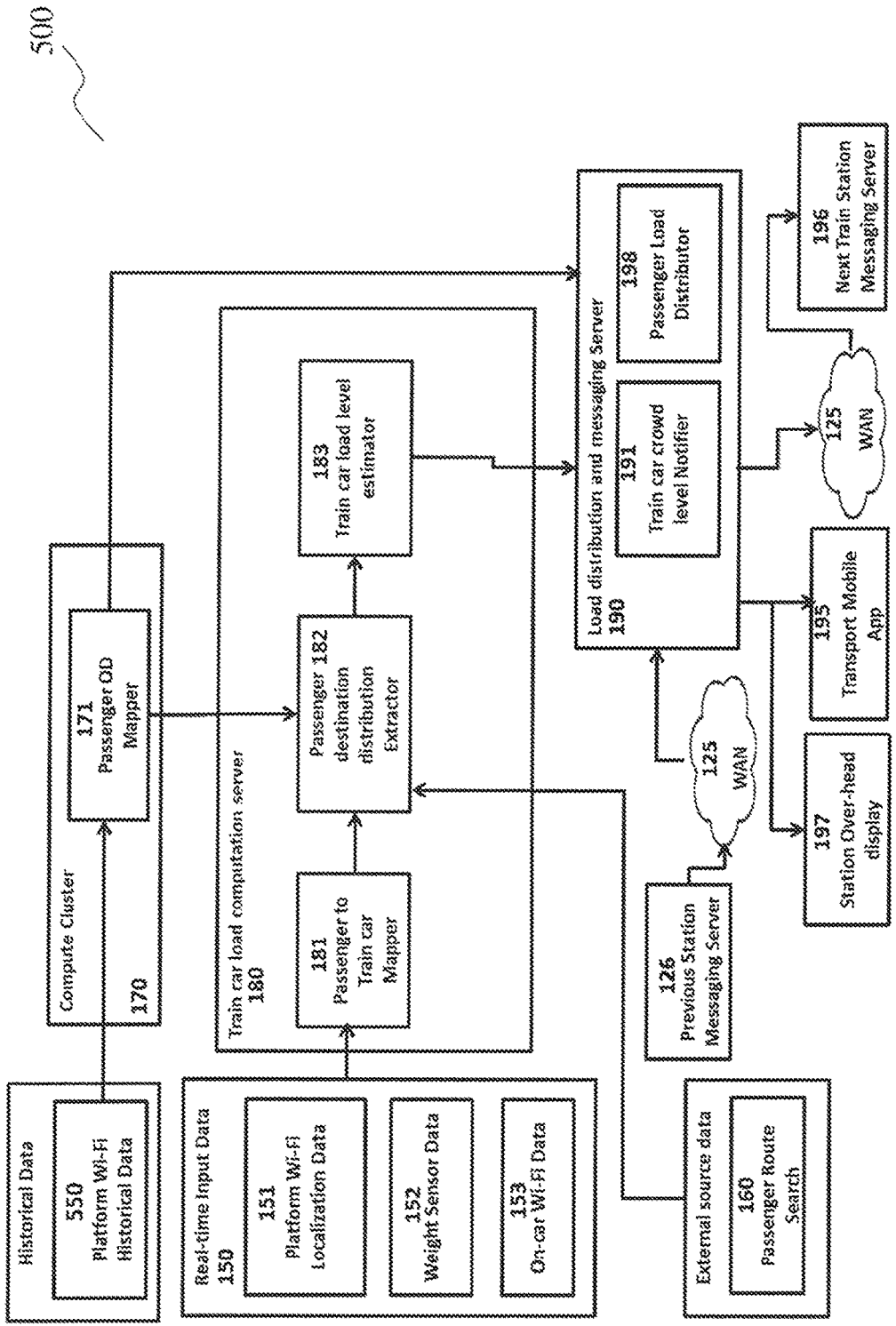
FIG. 5 shows the data flow diagram of a passenger load prediction system according to various embodiments.

FIG. 5 shows the data flow diagram 500 of a passenger load prediction system according to various embodiments. The passenger load prediction system may be the passenger load prediction system 400. Historical data including platform Wi-Fi historical data 550 may be provided to a passenger OD mapper 171 of a compute cluster 170. The platform Wi-Fi historical data 550 may be the platform Wi-Fi historical data 850 of FIG. 4. The compute cluster 170 may be the compute cluster 810 of FIG. 4. The passenger OD mapper 171 may be the passenger OD mapper 816 of FIG. 4. The passenger OD mapper 171 may utilize the platform Wi-Fi historical data 550 to extract the origin-destination (OD) pairs for passengers in the train cars. One or more of the passenger OD Mapper 171 component may run in the compute cluster 170 to process the platform Wi-Fi historical data 550 to obtain the OD pair mappings.

A train car load computation server 180 may receive real-time input data 150. The train car load computation server 180 may be the train car load computation server 800 of FIG. 4. The real-time input data 150 may include at least one of platform Wi-Fi localization data 151, weight sensor data 152 or on-car Wi-Fi data 153. The real-time input data 150 may be the real-time data 830 of FIG. 4. The platform Wi-Fi localization data 151 may be the platform Wi-Fi localization data 831 of FIG. 4. The weight sensor data 152 may be the weight sensor data 832 of FIG. 4. The on-car Wi-Fi data 153 may be the on-car Wi-Fi data 833 of FIG. 4. The train car load computation server 180 may utilize the real-time input data 150 to estimate the train car load. The train car load computation server 180 may include a passenger to train car mapper 181, which may be the passenger to train car mapper 806 of FIG. 4. The train car load computation server 180 may further include a passenger destination distribution extractor 182 which may be the passenger destination distribution extractor 807 of FIG. 4. The train car load computation server 180 may further include a train car load level estimator 183 which may be the train car load level estimator 808 of FIG. 4. The passenger to train car mapper 181 may assign passengers to train cars based on at least one of the platform Wi-Fi localization data 151 or the on-car Wi-Fi data 153. The passenger destination distribution extractor 182 may receive at least one of the output of the passenger OD mapper 171 or the passenger route search 160. The passenger route search 160 may be the passenger route search 840 of FIG. 4. The passenger destination distribution extractor 182 may map passengers to their respective destinations, based on information from at least one of the passenger OD mapper 171 or the passenger route search 160. The passenger route search 160 may be part of an external source data. The external source data may come from any map service provider, for example Google maps. The train car load level estimator 183 may receive the output of the passenger destination distribution extractor 182 and the weight sensor data 152. The train car load level estimator 183 may compute the train car load for the next station, based on the output of the passenger destination distribution extractor 182 and the weight sensor data 152. One or more instances of the passenger to train car mapper 181, the passenger destination distribution extractor 182 and the train car load level estimator 183 may run on the train car load computation server 180 to perform computation of the train car load. The train car load level estimator 183 may provide its output, i.e. information on the train car load for the next station, to a load distribution and messaging server 190.

The load distribution and messaging server 190 may be the load distribution and messaging server 820 of FIG. 4. The load distribution and messaging server 190 may be in communication with a previous station messaging server 126. The load distribution and messaging server 190 may include at least one of a train car crowd level notifier 191 or a passenger load distributor 198. The train car crowd level notifier 191 may be the train car crowd level notifier 826 of FIG. 4. The passenger load distributor 198 may be the passenger load distributor 827 of FIG. 4. The passenger load distributor 198 may use the information on the train car load from the train car load level estimator of the previous station messaging server 126, to distribute passengers across the train cars uniformly. The previous station messaging server 126 may be at least substantially similar to the load distribution and messaging server 190, except that it belongs to the previous train station. The passenger load distributor 198 may use the OD pattern from the passenger OD mapper 171 to assign passengers travelling together to the same train car. The train car crowd level notifier 191 may receive information on the train car load from the train car load computation server 180 and may send messages on the crowd level in a suitable format to the next train station messaging server 196 for notification to the passengers. The next train station messaging server 196 may be at least substantially similar to the load distribution and messaging server 190, except that it belongs to the next train station. The next train station messaging server 196 may be located remotely at the next train station. The load distribution and messaging server 190 may transfer data to and fro each of the previous station messaging server 126 and the next train station messaging server 196 through a wide area network (WAN) 125 or over the internet through a secure connection. The train car crowd level notifier 191 may also receive messages from the previous station messaging server 126 to notify train car crowd level to passengers. The train car crowd level notifier 191 may notify the passengers waiting on the station platform, through at least one of station over-head displays 197 or transport mobile applications 195. The train car crowd level notifier 191 may use the passenger assignment information from the passenger load distributor 198 to send messages to individual passengers to board their assigned train car through the transport mobile app 195. One or more instances of the train car crowd level notifier 191 may run on the messaging server 190. The system shown in FIG. 5 may be replicated in each train station in an entire railway network, for computing the train car load for all trains in the network in a distributed manner. The replicated systems may be interconnected over WAN links 125 or the Internet over secure channels.

Figure 6:
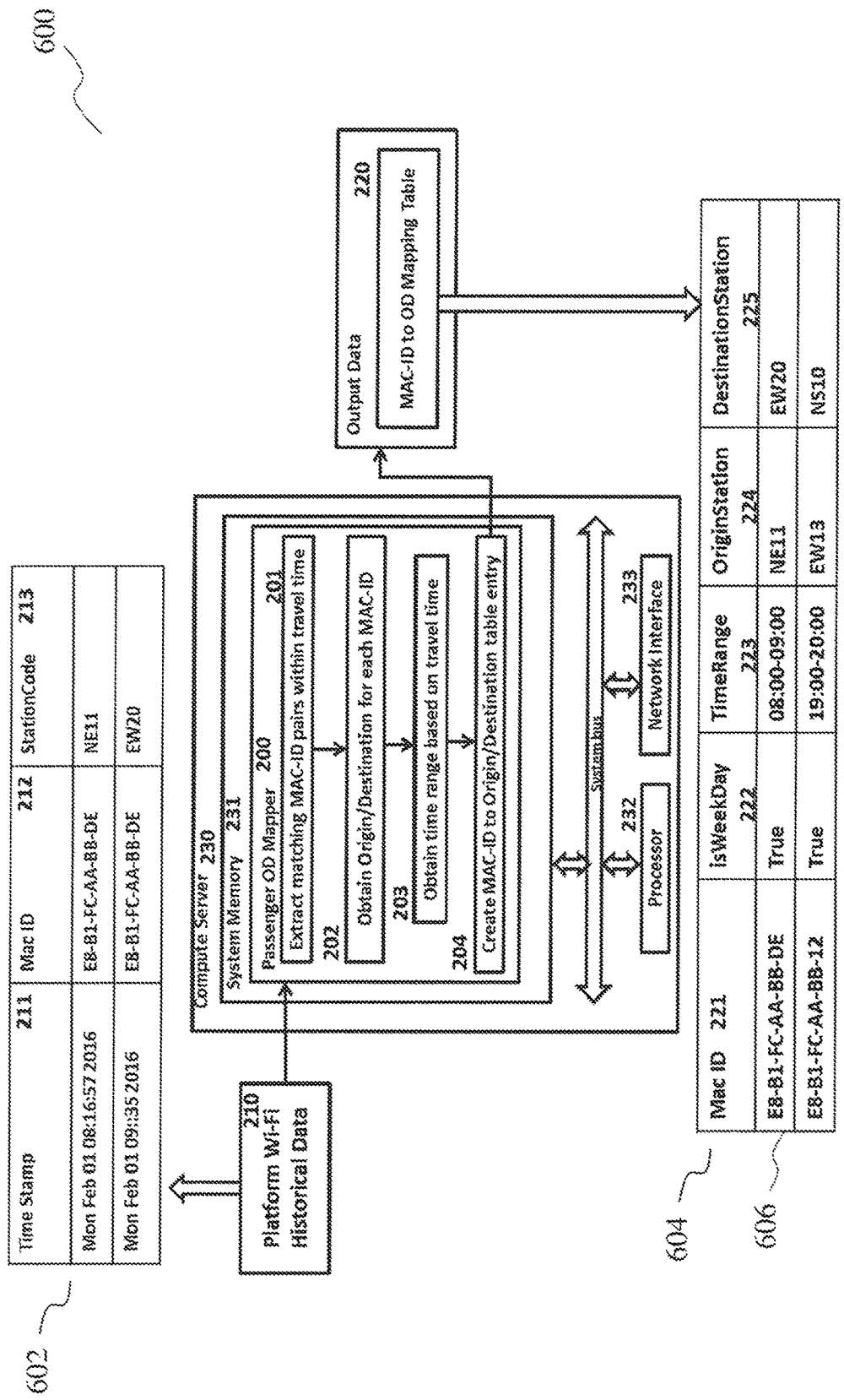
FIG. 6 shows a data flow diagram of a compute server according to various embodiments.

FIG. 6 shows a data flow diagram 600 of a compute server 230 according to various embodiments. The compute server 230 may be the compute server 811 of FIG. 4. The compute server 230 may be configured to map identifier codes of mobile devices carried by passengers to the travel patterns, i.e. origin-destination of the passengers. The compute server 230 may also be referred herein as a MAC-ID to OD mapper, in the event that the identifier code is the media access control (MAC) address. The compute server 230 may include components configured to extract the OD travel pattern of passengers. The compute server 230 may include a system memory 231 which may be the system memory 812 of FIG. 4. The compute server 230 may further include a processor 232 and a network interface 233. The system memory 812 may communicate with the processor 232 and the network interface 233 through a system bus. The processor 232 may be the processor 813 of FIG. 4. The network interface 233 may be the network interface 814 of FIG. 4. The compute server 230 may be part of a compute cluster including a plurality of compute servers 230 running in parallel to process input data, for example using Hadoop Map-Reduce. The compute server 230 may receive platform Wi-Fi historical data 210 as an input. The platform Wi-Fi historical data 210 may be the platform Wi-Fi historical data 850 of FIG. 4. The platform Wi-Fi historical data 210 may include the time stamp 211 when the mobile device was seen, the identifier code or MAC-ID 212 of the mobile device detected by the Wi-Fi router and the station code 213 where the mobile device was detected. A passenger OD mapper 200 may be stored in the system memory 231. The passenger OD mapper 200 may be the passenger OD mapper 816 of FIG. 4 or the passenger OD mapper 171 of FIG. 5. The platform Wi-Fi historical data 210 provided to the passenger OD mapper 200 may be in any format from the group of comma separated values (CSV), relational database rows and other standard or known formats. An example of the data format with example values is shown in the table 602. The passenger OD mapper 200 may be configured to carry out a plurality of processing steps. In step 201, the passenger OD mapper 200 may extract the identifier code or MAC-ID from the platform Wi-Fi historical data 210. The passenger OD map may find matching identifier codes in subsequent entries of the Wi-Fi data. For example, a particular identifier code may appear twice within a predetermined travel time of one hour. This information may constitute a matched pair. In step 202, the passenger OD mapper 200 may obtain the origin-destination information from each matched pair, based on the time stamp 211. In step 203, the matched pair may be mapped to a time range to differentiate travel OD patterns of the same passenger or the particular identifier code, for different times of the day. For example, the matched pair may be mapped to one or morning, afternoon or night. In step 204, an entry in a mapping table 220 may be created. The mapping table 220 may also be referred herein as identifier-code to OD mapping table or MAC-ID to OD mapping table. The mapping table 220 may include the identifier code or MAC-ID 221 of the passenger, an OriginStation field 224 stating the start point of the journey and a DestinationStation field 225 stating the end point of the journey. The mapping table 220 may further include an isWeekDay 222 Boolean field to indicate whether the corresponding journey was conducted on a week day. The mapping table 220 may further include a TimeRange field 223 indicating the time range within which the journey was started, as determined from the time stamp of the start point of the journey. The table 604 shows an example of the mapping table 220. While the table 604 shows a one hour range for the TimeRange field 223, the granularity of the TimeRange field 223 may be varied to for example, 30 minutes. The time range may be configurable. The table 604 shows an example where the first entry 606 includes information that the MAC-ID 'E8-B1-FC-AA-BB-DE' was detected on a weekday as indicated by "True" in the isWeekday field 222, between 8 am to 9 am as indicated by the TimeRange field 223, at the station NE11 as indicated in the OriginStation field 224 and was later detected at EW20 as indicated in the DestinationStation field 225. It may be inferred from the first entry 606, that on a weekday, a passenger carrying a mobile device bearing the MAC-ID 'E8-B1-FC-AA-BB-DE' boarded the train at NE11 station between the time of 8 am to 9 am and then alighted the train at EW20 station.

Figure 7:
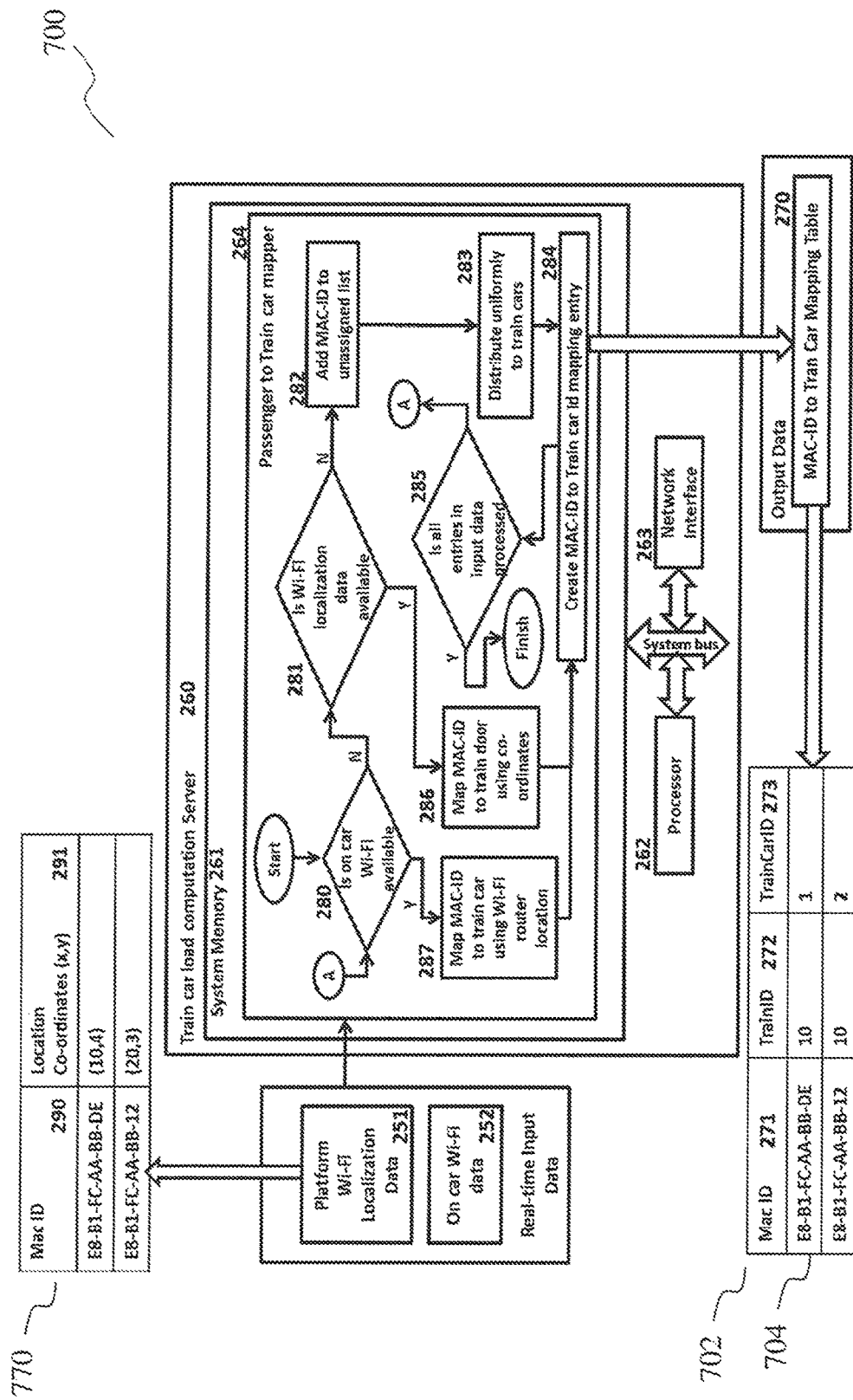
FIG. 7 shows an execution flow diagram of a passenger to train car mapper according to various embodiments.

FIG. 7 shows an execution flow diagram 700 of a passenger to train car mapper 264 according to various embodiments. The passenger to train car mapper 264 may run on a train car load computation server 260. The train car load computation server 260 may be the train car load computation server 800 of FIG. 4 or the train car load computation server 180 of FIG. 5. The train car load computation server may include a system memory 261, a processor 262 and a network interface 263. The processor 262 may be the processor 803. The system memory 261 may be the system memory 801. The network interface 263 may be the network interface 802. The passenger to train car mapper 264 may run on the system memory 261. The passenger to train car mapper 264 may be the passenger to train car mapper 806 of FIG. 4 or the passenger to train car mapper 181 of FIG. 5. The passenger to train car mapper 264 may be configured to map or assign passengers to train cars using at least one of platform Wi-Fi localization data 251 or on-car Wi-Fi data 252. The platform Wi-Fi localization data 251 may be the platform Wi-Fi localization data 831 of FIG. 4 or the platform Wi-Fi localization data 151 of FIG. 5. The on-car Wi-Fi data 252 may be the on-car Wi-Fi data 833 of FIG. 4 or the on-car Wi-Fi data 153 of FIG. 5. The platform Wi-Fi localization data 251 may include the identifier code of the detected passenger's device. The passenger's device may also be referred herein as the mobile device. The identifier code may be MAC-ID 290. The platform Wi-Fi localization data 251 may further include the location of the passenger's device with respect to a router on the platform. The location of the passenger's device may be represented by x,y co-ordinates 291.

The passenger to train car mapper 264 may be configured to carry out a plurality of processing steps. In step 280, the passenger to train car mapper 264 may check whether on-car Wi-Fi data 252 is available. If the on-car Wi-Fi data 252 is available, the passenger to train car mapper 264 may map the identifier code of the passenger's device to the train car based on the Wi-Fi router location extracted from the On-car Wi-Fi data 252. If the on-car Wi-Fi data 252 is not available, in step 281, the passenger to train car mapper 264 may check whether the platform Wi-Fi localization data 251 is available. If the platform Wi-Fi localization data 251 is available, the passenger to train car mapper 264 may use the location co-ordinates 291 to localize the passenger's device to the nearest train car door which in turn identifies the train car, in step 286. In step 284, an entry in the identifier code to train car mapping table or the MAC-ID to train car mapping table 270 may be created. The MAC-ID to train car mapping table 270 may include the MAC-ID 271 of the passenger's device, TrainID 272 of the train for which the load is calculated and TrainCarID 273 of the train car to which the passenger is assigned. If the platform Wi-Fi localization data 251 is unavailable, in step 282, the identifier code is added to an unassigned list. In step 283, the list of unassigned identifier codes may be distributed uniformly across the train. Once the MAC-ID to train car mapping entries are created in step 284, the step 285 may check whether all the entries in the input data or all the detected passenger devices are processed. The entire work flow in the passenger to train car mapper 264 may be repeated until all the entries are processed. FIG. 7 also shows an example of the MAC-ID to train car mapping table 270, in the form of an example table 702. The example table 702 includes a first row 704 showing the first entry. The first entry shows that the passenger's device with MAC-ID 271 'E8-B1-FC-AA-BB-DE' is assigned to the train car having a TrainCarID 273 '1'. The TrainCarID 273 having value '1' may indicate that the passenger is in the first train car. The location of the first train car may correspond to the location co-ordinates 291 of '(10,4)' stated in the example platform Wi-Fi localization table 770. The passenger to train car mapper 264 may localize the co-ordinates '(10,4)' to the train car door with TrainCarID '1'.

Figure 8:
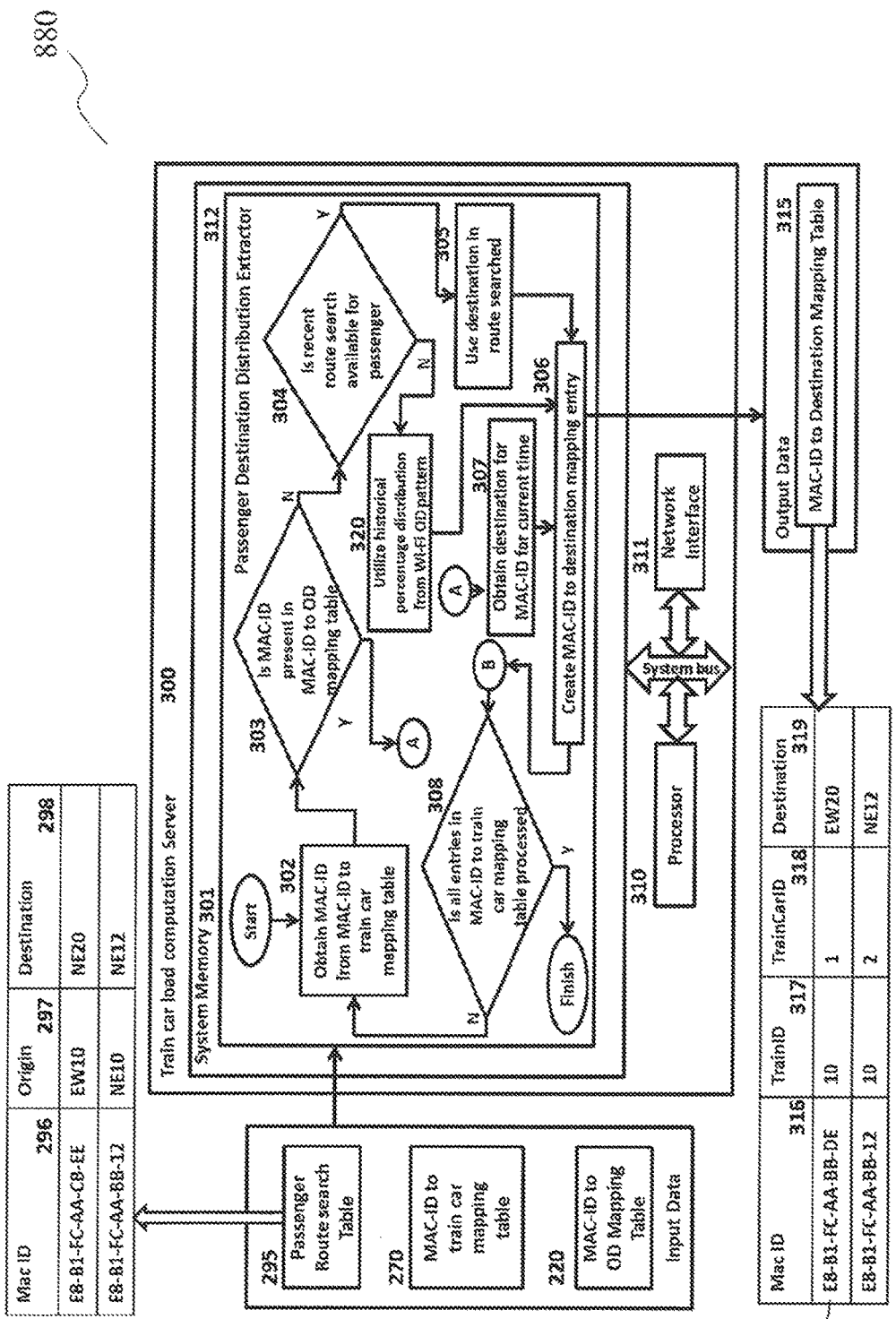
FIG. 8 shows an execution flow diagram of a passenger destination distribution extractor according to various embodiments.

FIG. 8 shows an execution flow diagram 880 of a passenger destination distribution extractor 312 according to various embodiments. The passenger destination distribution extractor 312 may run on a train car load computation server 300. The train car load computation server 300 may be the train car load computation server 260 of FIG. 4, or the train car load computation server 800 of FIG. 4, or the train car load computation server 180 of FIG. 5. The train car load computation server may include a system memory 301, a processor 310 and a network interface 311. The processor 310 may be the processor 262 or the processor 803. The system memory 301 may be the system memory 261 or the system memory 801. The network interface 311 may be the network interface 263 or the network interface 802. FIG. 8 shows the system components utilized for mapping passengers in train cars to their destinations using the MAC-ID to OD Mapping table 220 obtained from the passenger OD Mapper 200 of FIG. 6, the MAC-ID to train car mapping table 270 obtained from the passenger to train car mapper 264 of FIG. 7 and the passenger route search table 295 obtained from an external data source. The passenger route search table 295 may be obtained from the passenger route search 840 or the passenger route search 160.

In step 302, the passenger destination distribution extractor 312 may obtain the MAC-ID from the MAC-ID to train car mapping table 270. In step 303, the passenger destination distribution extractor 312 may check if the MAC-ID is present in the MAC-ID to OD mapping table 220. If the MAC-ID is present in the MAC-ID to OD mapping table 220, in step 307, a corresponding destination may be obtained for the table entry with time range within current time. An entry may be created in the MAC-ID to destination mapping table 315. The MAC-ID to destination mapping table 315 may include the MAC-ID 316 of the passenger's device, the TrainID 317 of the train for which the load is calculated, the TrainCarID 318 which is the train car to which the MAC-ID was mapped in the MAC-ID to train car mapping table 270 and the destination 319 of the passenger obtained from the MAC-ID to OD mapping table 220. If the MAC-ID is not found in the MAC-ID to OD mapping table in step 303, the execution flow may proceed to step 304. In step 304, the passenger destination distribution extractor 312 may check whether there is a recent route search by the passenger in the passenger route search table 295 identified by the MAC-ID 296. If there is a recent route search by the passenger for a destination 298, the destination 298 may be used as the passenger's destination and an entry may be created in the MAC-ID to destination mapping table 306 as before. If the MAC-ID is not found in the Passenger route search table 295, in step 320, the percentage destination distribution obtained from the Wi-Fi data OD pattern analysis may be utilized to assign a destination to the passenger. The execution flow may then move to step 308 to continue with the next entry in the MAC-ID to train car mapping table 270. The execution flow may be repeated until all the entries in the MAC-ID to train car mapping table 270 are processed. FIG. 8 also includes an example of the MAC-ID to destination mapping table 315 in the form of a table 882. The first entry shows that the passenger's device with MAC-ID 'E8-B1-FC-AA-BB-DE' is assigned to train car with Train-CarID 318 '1' and destination 319 'EW20'. The destination 319 'EW20' is obtained from the MAC-ID to OD mapping table 220 that was created by the Passenger OD Mapper 200 in FIG. 6. The TrainCarID 318 '1' was obtained from the MAC-ID to train car mapping table 270 created by the Passenger to train car mapper 264 in FIG. 7.

Figure 9:
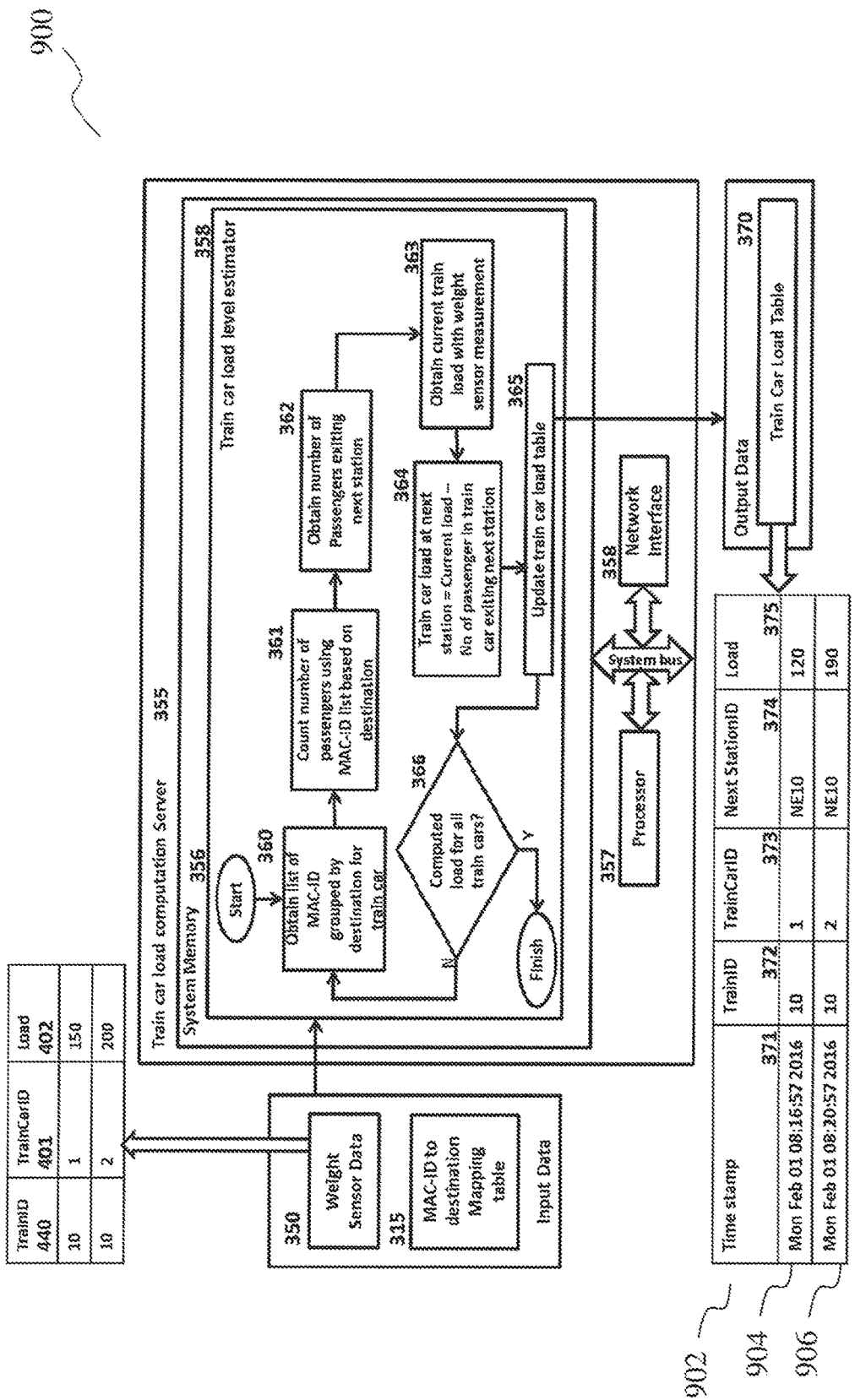
FIG. 9 shows the execution flow diagram of a train car load level estimator according to various embodiments.

FIG. 9 shows the execution flow diagram 900 of a train car load level estimator 358 according to various embodiments. FIG. 9 shows the system components utilized for computing the train car load using the MAC-ID to destination mapping table 315 and the weight sensor data 350. The train car load level estimator 358 may run on a train car load computation server 355. The train car load computation server 355 may include a processor 357, a system memory 356 and a network interface 358. The train car load computation server 355 may be the train car load computation server 300, 260, 180 or 800. The processor 357 may be the processor 310, 262 or 803. The system memory 356 may be the system memory 301, 261 or 801. The network interface 358 may be the network interface 311, 263 or 802. The train car load level estimator 358 may obtain the list of MAC-ID grouped by destination for a given train car in step 360. In step 361, this list may be counted based on destination. In step 362, the number of passenger exiting the next station may be obtained. In step 363, the current train car load 402 may be obtained from the weight sensor data 350 for the given TrainCarID 401 for the current train with TrainID 440. In step 364, the number of passengers alighting next station obtained in step 362 may be excluded from the train car load obtained from step 363. This final train car load result may be updated in the train car load table 365. In step 366, the train car load level estimator may check if MAC-ID entries for all train cars have been processed. If the MAC-ID entries for all of the train cars have not been completely processed, the execution flow may be repeated for all train cars. The train car load table 370 may include the Time stamp 371 field when the entry was created, TrainCarID 373 of the train for which the load was estimated, TrainID 372 of the train to which the train car belongs, the next station ID 374 to which the train is heading and finally the load 375 of the estimated number of passengers at the next station. FIG. 9 also includes a table 902 showing an example of the Train car load table 370. The first entry 904 of the table 902 shows that the first entry is created at time "Mon Feb 01 08:16:57 2016" for the train with TrainID 372 "10" with one of the train car with TrainCarID 373 '1' with the train heading for the next station with next stationID "NE10" and the load 375 which is computed by the Train car load level estimator 358. The second entry 906 is for a different train car on the same train.

Figure 10:
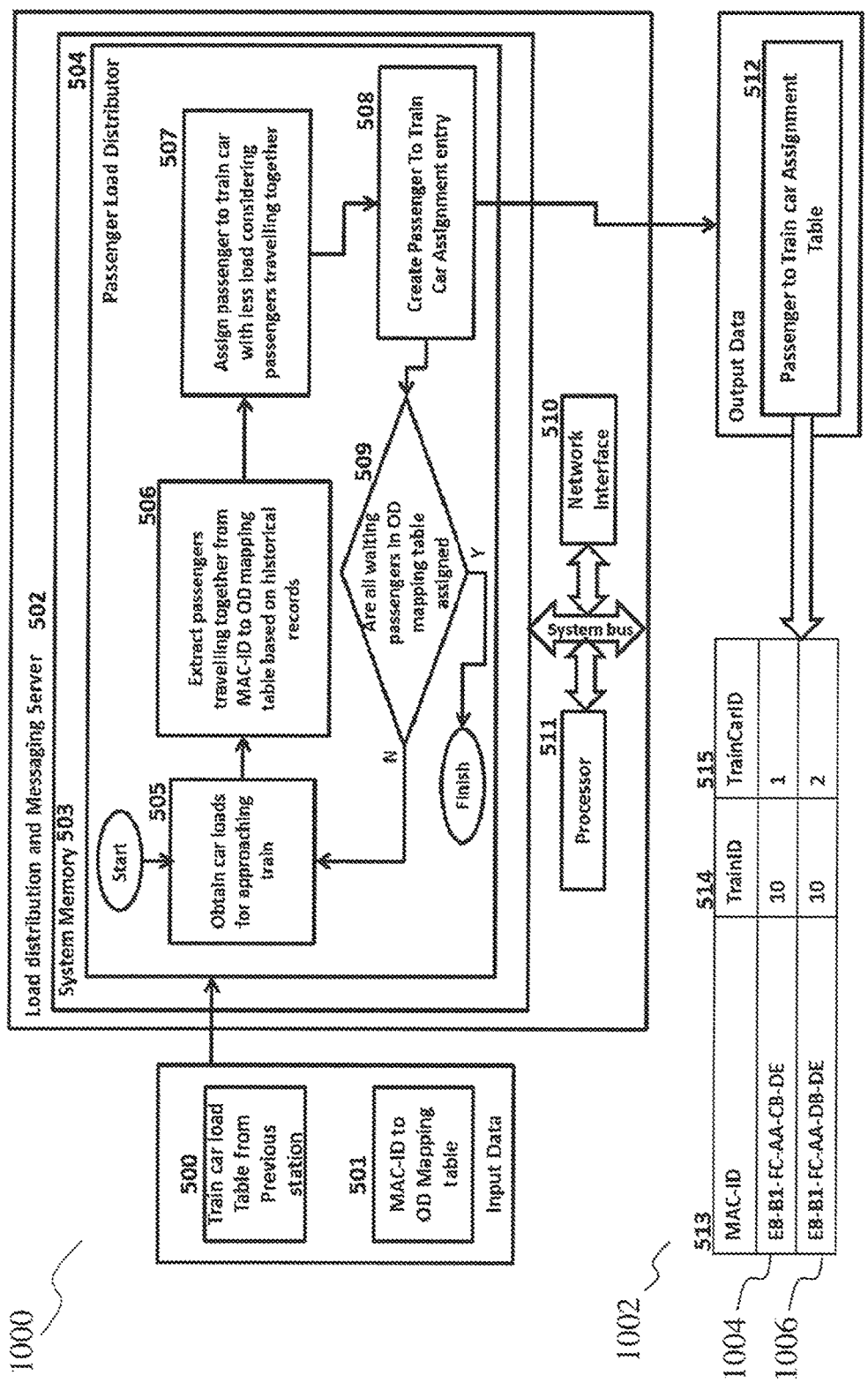
FIG. 10 shows an execution flow diagram of a passenger load distributor according to various embodiments.

FIG. 10 shows an execution flow diagram 1000 of a passenger load distributor according to various embodiments. FIG. 10 shows the system components utilized for computing the passenger load assignment based on the train car load table from previous station 500 and the MAC-ID to OD mapping table 501 created by the passenger to OD mapper 200 in FIG. 5. The passenger load distributor 504 may run on the load distribution and messaging server 502. The load distribution and messaging server 502 may include a processor 511, a system memory 503 and a network interface 510. The passenger load distributor 504 may obtain car loads of the approaching train from the train car load table 500 in step 505. The passenger load distributor 504 may extract passengers commonly travelling together using historical records of the MAC-ID to OD mapping table 501 in step 506. Using this information the passenger load distributor 504 may assign passengers to train cars in step 507 based on crowd levels so that the passengers are uniformly distributed. In step 508, the passenger to train car assignment entry is created in the passenger to train car assignment table 512. In step 509, the passenger load distributor 504 may check whether all passengers in the current waiting passengers OD mapping table are handled. If not handled, the process may be repeated for all the waiting passengers to create the assignments. FIG. 10 also includes a table 1002 showing an example of the passenger to train car assignment table 512. The table 1002 includes the MAC-ID 513 of a specific passenger's device and the corresponding train car identified by the TrainCarID 515 belonging to the approaching train identified by the TrainID 514. For example, the MAC-ID "E8-B1-FC-AA-CB-DE" and "E8-B1-FC-AA-DB-DE" are assigned to train cars '1' and '2' respectively for the train identified by TrainID '10'.

Figure 11:
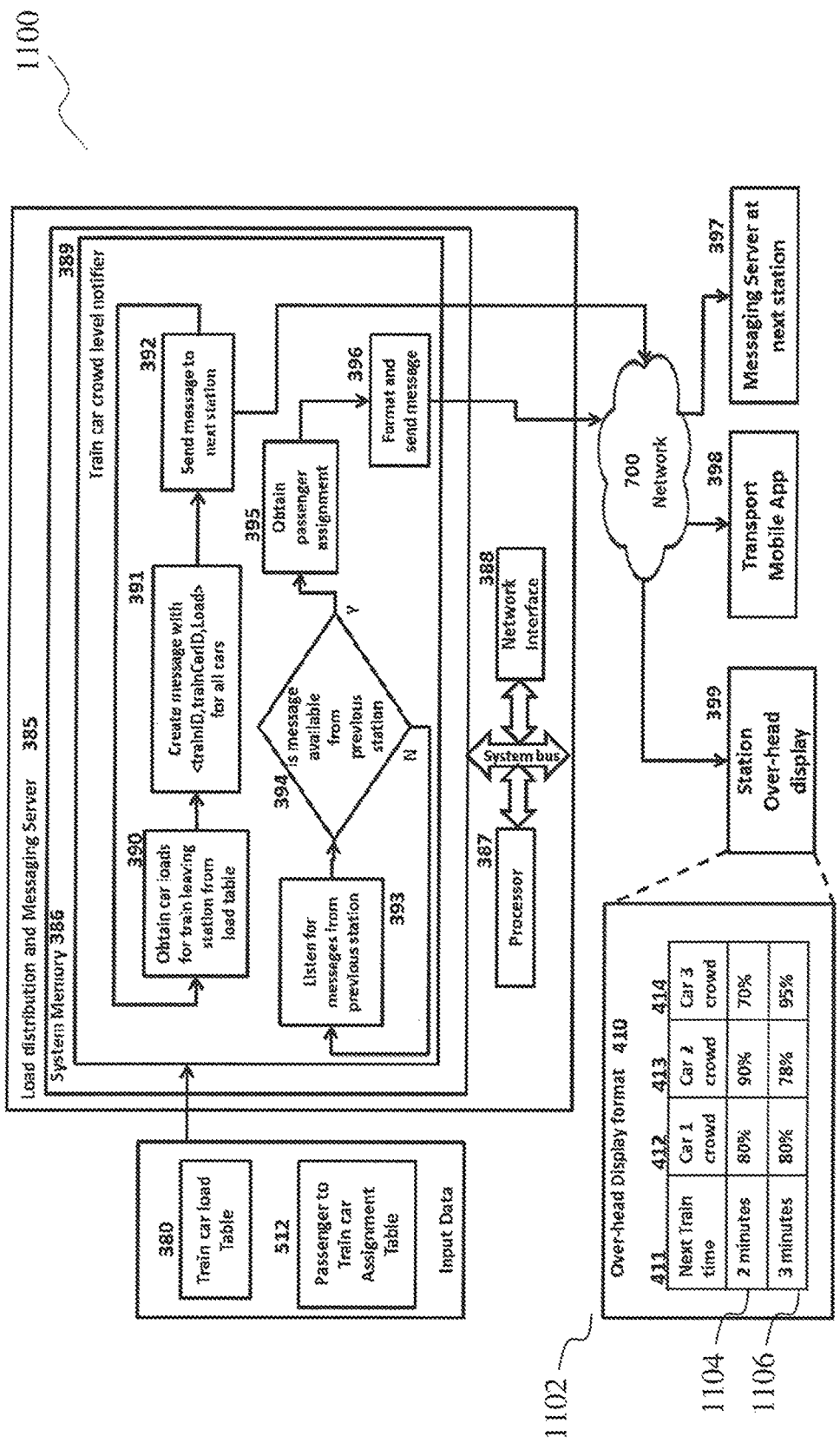
FIG. 11 shows an execution flow diagram within a train car crowd level notifier according to various embodiments.

FIG. 11 shows an execution flow diagram 1100 within a train car crowd level notifier according to various embodiments. FIG. 11 shows the system components utilized for notification of train load or crowd level in the train cars obtained from the train car load table 370 computed by the train car load level estimator 358 of FIG. 9. The train car crowd level notifier 389 may run on the load distribution and messaging server 385. The load distribution and messaging server 385 may include a system memory 386, a processor 387 and a network interface 388. In step 390, the train car load level notifier 389 may obtain the car load for the train leaving the station in step 390 from the train car load table 380. In step 391, the train car load level notifier 389 may create a message with a suitable format (e.g. JSON) for all train cars and may send these messages in step 392, to the next station message server 395. This flow of execution involving sending of train car load messages may run whenever there are new entries created by the train car load level estimator 358 in the train car load table 380 as trains arrive at the station. In another execution flow, in step 393, the train car crowd level notifier 389 may listen for messages from the previous station. If there are any messages from the previous station, in step 395, the passenger assignment from passenger to train car assignment table 512 may be used in step 395 to send individual messages to the passengers to indicate the train car to board. The message may be converted to the desired format in step 396 and may be sent to the transport mobile app 398 through standard push services or Application Programming Interface. All the passengers subscribed to the service may receive the crowd level messages through the transport app 398 which may run on different types of smart phones, for example the smart phones may run on iOS, Android or Windows Mobile. The messages may also be aggregated to indicate the train car crowd level which is sent to the over-head displays 399 in the station platforms. The messages may be transported over standard Network 700 over LAN for the station displays. The load level for the train leaving the station may be sent over WAN links to the next station message server 397 or over the internet through a secured channel. FIG. 11 includes a table 1102 showing an example of the display format 410 of the crowd level on the over-head display. It may be noted that the display format 410 need not be limited to the table 1102. The display format 410 may include several other ways of displaying the crowd level information, for example in the form of a pie chart or graphics. In the example shown, the Next train time 411 shows the number of minutes for arrival of the next train. Car 1 crowd 412, car 2 crowd 413 and car 3 crowd 414 may indicate the level of crowdedness in the car in terms of a percentage, for example 100% may indicate that the train car is fully occupied. While the example shows three train cars in the train, the system may support trains with any number of train cars.

FIG. 12 shows an example 1200 of a display format 600 in the transport mobile app 397 according to various embodiments. The display format 600 may be similar to the display format or interface as for the over-head display. The example 1200 shows the train arrival information with the same format with Next train time 601, percentage Load level in car 1, car 2 and car 3. In addition, it may also show a recommended boarding car 605 which is the train car that is recommended for the passenger to board. The boarding information may be obtained from the Passenger to Train car assignment table 512 in FIG. 9. The transport mobile app 397 may be configured to push information concerning at least one of the train car crowd level or the recommended boarding car to the passenger's smart phone, for example in the form of automatic notifications. The transport mobile app 397 may encourage passengers to board the train cars that are less crowded so that the passenger distribution across the train cars may be even.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. A passenger load prediction system comprising:
a component configured to detect a wireless device carried by a passenger on a train or a train station platform, the train comprising a plurality of train cars;
a passenger to train car mapper configured to determine a location of the passenger, based on a location of the wireless device;
a destination predictor configured to predict a destination of the passenger, based at least in part on an identifier code of the wireless device;
a train car load level estimator configured to predict a respective passenger load of each train car of the plurality of train cars, based on the predicted destination and further based on the determined location of the passenger; and
a plurality of platform wireless routers, each platform wireless router of the plurality of platform wireless routers positioned at a respective train station,
wherein the passenger to train car mapper is configured to determine the location of the passenger by triangulating the wireless device with respect to at least one platform wireless router of the plurality of platform wireless routers.

2. The passenger load prediction system of claim 1, wherein the wireless device comprises a route search application configured to receive user inputs indicating a desired destination.

3. The passenger load prediction system of claim 2, wherein the destination predictor is configured to predict the destination of the passenger based on the desired destination.

4. The passenger load prediction system of claim 1, wherein the location of the passenger is indicated as one train car of the plurality of train cars, where the passenger boarded the train.

5. The passenger load prediction system of claim 1, further comprising a wireless router, wherein the wireless router is configured to detect a plurality of wireless devices of different passengers and further configured to retrieve the identifier code of each wireless device of the plurality of wireless devices.

6. The passenger load prediction system of claim 1, further comprising a plurality of on-car wireless routers, each on-car wireless router of the plurality of on-car wireless routers positioned at a respective train car of the plurality of train cars.

7. The passenger load prediction system of claim 6, wherein the passenger to train car mapper is configured to determine the location of the passenger by detecting the wireless device using one on-car wireless router of the plurality of on-car wireless routers.

8. The passenger load prediction system of claim 1, further comprising a passenger origin-destination mapper configured to obtain a journey database of the passenger based on historical records of wireless devices connected to a platform wireless router of the plurality of platform wireless routers or a wireless router positioned at one train car of the plurality of train cars, the journey database comprising a start point and an end point of each journey matched with the identifier code of the wireless device.

9. The passenger load prediction system of claim 1, wherein the train car load level estimator is configured to predict the respective passenger load of each train car of the plurality of train cars, further based on a respective weight load of each train car obtained using weight sensors on the train cars.

10. The passenger load prediction system of claim 1, further comprising a train car crowd level notifier configured to generate notifications based on the predicted respective passenger load of each train car.

11. The passenger load prediction system of claim 1, further comprising a passenger load distributor configured to compute an optimal distribution of further passengers to each train car, based on the predicted respective passenger load of each train car and further based on identification of passengers travelling as a group, wherein the identification of passengers travelling as a group is obtained from historical records of identifier codes of wireless devices which simultaneously undertook common journeys.

12. A passenger load prediction system comprising:
a component configured to detect a wireless device carried by a passenger on a train or a train station platform, the train comprising a plurality of train cars;
a passenger to train car mapper configured to determine a location of the passenger, based on a location of the wireless device;
a destination predictor configured to predict a destination of the passenger, based at least in part on an identifier code of the wireless device;
a train car load level estimator configured to predict a respective passenger load of each train car of the plurality of train cars, based on the predicted destination and further based on the determined location of the passenger; and
a passenger origin-destination mapper configured to obtain a journey database of the passenger based on historical records of wireless devices connected to a wireless router positioned at one train station or one train car of the plurality of train cars, the journey database comprising a start point and an end point of each journey matched with the identifier code of the wireless device, wherein the passenger origin-destination mapper is configured to match historical records of wireless devices having common identifier codes detected during predetermined travel intervals on different days of the week, to determine the start point and the end point of each journey of the passenger.

13. The passenger load prediction system of claim 12, further comprising a plurality of platform wireless routers, each platform wireless router of the plurality of platform wireless routers positioned at a respective train station.

14. A passenger load prediction system comprising:
- a component configured to detect a wireless device carried by a passenger on a train or a train station platform, the train comprising a plurality of train cars;
- a passenger to train car mapper configured to determine a location of the passenger, based on a location of the wireless device,
- wherein the wireless device comprises a route search application configured to receive user inputs indicating a desired destination;
- a destination predictor configured to predict a destination of the passenger, based at least in part on the desired destination;
- a train car load level estimator configured to predict a respective passenger load in each train car of the plurality of train cars, based on the predicted destination and further based on the determined location of the passenger; and
- a plurality of platform wireless routers, each platform wireless router of the plurality of platform wireless routers positioned at a respective train station,
- wherein the passenger to train car mapper is configured to determine the location of the passenger by triangulating the wireless device with respect to at least one platform wireless router of the plurality of platform wireless routers.

* * * * *